US012074337B2

(12) United States Patent
You et al.

(10) Patent No.: US 12,074,337 B2
(45) Date of Patent: Aug. 27, 2024

(54) BATTERY PACK AND TRANSPORTATION VEHICLE

(71) Applicant: Contemporary Amperex Technology Co., Limited, Ningde (CN)

(72) Inventors: Kaijie You, Ningde (CN); Yongguang Wang, Ningde (CN); Peng Wang, Ningde (CN); Xingdi Chen, Ningde (CN); Yu Tang, Ningde (CN); Zequan Lu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 959 days.

(21) Appl. No.: 16/980,316

(22) PCT Filed: Nov. 19, 2019

(86) PCT No.: PCT/CN2019/119354
§ 371 (c)(1),
(2) Date: Sep. 11, 2020

(87) PCT Pub. No.: WO2021/097644
PCT Pub. Date: May 27, 2021

(65) Prior Publication Data
US 2021/0249731 A1 Aug. 12, 2021

(51) Int. Cl.
*H01M 50/342* (2021.01)
*B60L 50/60* (2019.01)
*H01M 50/249* (2021.01)

(52) U.S. Cl.
CPC ......... *H01M 50/3425* (2021.01); *B60L 50/60* (2019.02); *H01M 50/249* (2021.01); *H01M 2220/20* (2013.01)

(58) Field of Classification Search
CPC .............................. H01M 50/20; H01M 50/30
See application file for complete search history.

(56) References Cited

U.S. PATENT DOCUMENTS

2016/0036022 A1* 2/2016 Tononishi ........... H01M 10/658
429/53
2016/0133995 A1* 5/2016 Hattori ............. H01M 10/0587
429/61

(Continued)

FOREIGN PATENT DOCUMENTS

CN 105027323 A 11/2015
CN 209401710 U 9/2019

(Continued)

OTHER PUBLICATIONS

Extended European Search Report issued in European Application No. 19910917.4, mailed Jan. 29, 2021, 6 pages.

(Continued)

*Primary Examiner* — Maria Laios
*Assistant Examiner* — Jordan E Berresford
(74) *Attorney, Agent, or Firm* — STERNE, KESSLER, GOLDSTEIN & FOX P.L.L.C.

(57) ABSTRACT

The present disclosure relates to a battery pack and transportation vehicle, wherein the battery pack includes: a box assembly; a restraint assembly disposed within the box assembly, wherein the restraint assembly is internally provided with an accommodating cavity, a first exhaust passage is provided between the restraint assembly and the box assembly, and the restraint assembly is provided with a communication hole which communicates the accommodating cavity with the first exhaust passage; and a battery module disposed within the accommodating cavity.

16 Claims, 5 Drawing Sheets

(56) References Cited

U.S. PATENT DOCUMENTS

| | | | |
|---|---|---|---|
| 2018/0034021 A1 | 2/2018 | Yamamoto et al. | |
| 2019/0020001 A1* | 1/2019 | Nakano | H01M 50/383 |
| 2019/0221790 A1 | 7/2019 | Xing | |

FOREIGN PATENT DOCUMENTS

| | | |
|---|---|---|
| CN | 209447890 U | 9/2019 |
| CN | 209561492 U | 10/2019 |
| EP | 2475028 A1 | 7/2012 |
| JP | 2008-192551 A | 8/2008 |
| JP | 2012-028353 A | 2/2012 |
| JP | 2016-134245 A | 7/2016 |
| JP | 2019-145245 A | 8/2019 |
| WO | 2014/065110 A1 | 9/2016 |

OTHER PUBLICATIONS

Notice of Reasons for Refusal issued in Japanese Application No. 2022-526106, mailed Jul. 3, 2023, 8 pages.

Notice of Allowance issued in Chinese Application No. 201980097284.1, mailed Feb. 29, 2024, 4 pages.

\* cited by examiner

BATTERY PACK AND TRANSPORTATION VEHICLE

CROSS-REFERENCE TO RELATED APPLICATION

This application is the United States national phase of International Application No. PCT/CN2019/119354 filed on Nov. 19, 2019, the disclosures of which are hereby incorporated in their entirety by reference.

FIELD OF THE DISCLOSURE

The present disclosure relates to the field of battery technology, and in particular, to a battery pack and a transportation vehicle.

BACKGROUND OF THE DISCLOSURE

In recent years, a rechargeable battery pack has been widely applied to power vehicles. A plurality of battery units in a battery pack are connected in a series, parallel, or hybrid manner to achieve a greater capacity or power.

The battery units in a current battery are in a space isolated from the outside, when the battery units suffer from thermal runaway, the ejected sparks and hot air are both diffused in the compartment where the battery units are located. Since the battery units are in a limited compartment space, the ejected sparks and hot air after thermal runaway of the battery unit will rapidly raise the temperature within the compartment, especially at a position near the battery units suffering from thermal runaway, and the temperature often exceeds a triggering temperature upon thermal runaway of the battery units. At the same time, the sparks ejected from the battery units suffering from thermal runaway might splash to the surrounding battery units, which is likely to cause that the surrounding batteries successively suffer from thermal runaway, thereby creating a chain reaction so that there is a great potential safety hazard.

SUMMARY OF THE DISCLOSURE

According to one aspect of the embodiments of the present disclosure, a battery pack is provided. The battery pack including:
a box assembly;
a restraint assembly, disposed within the box assembly, wherein the restraint assembly is internally provided with an accommodating cavity, a first exhaust passage is provided between the restraint assembly and the box assembly, and the restraint assembly is provided with a communication hole which communicates the accommodating cavity with the first exhaust passage; and
a battery module, disposed within the accommodating cavity.

In some embodiments, the box assembly is internally provided with a plurality of fixed beams, the restraint assembly is fixed to two adjacent fixed beams, and the first exhaust passage is formed among the restraint assembly, the box assembly and the two adjacent fixed beams.

In some embodiments, the battery module includes a plurality of battery units, each of the plurality of battery units is provided with a first explosion-proof valve; and
a second exhaust passages is provided between the restraint assembly and the battery module, each of the first explosion-proof valves faces the second exhaust passage, and the communication hole communicates the second exhaust passage with the first exhaust passage.

In some embodiments, the battery pack further including: a fireproof member disposed between the restraint assembly and the battery module and covering the first explosion-proof valve of each of the plurality of battery units, wherein a second exhaust passage is formed between the fireproof member and the battery module.

In some embodiments, the restraint assembly is provided with a plurality of the communication holes, each of which is in one-to-one correspondence with each of the first explosion-proof valves.

In some embodiments, a first gap is provided between an outer side of the restraint assembly and an inner side of the box assembly, the outer side of the restraint assembly and the inner side of the box assembly face each other along a height direction of the battery pack, and the first gap forms the first exhaust passage.

In some embodiments, the battery module includes a plurality of battery units, a first surface of each of the plurality of battery units is opposite to a top side or a bottom side of the restraint assembly, the first surface is the largest side of each of the plurality of battery units, and a second surface of each of the plurality of battery units is provided with a first explosion-proof valve, the second surface is perpendicular to the first surface; wherein the communication hole is disposed on the top side or the bottom side of the restraint assembly.

In some embodiments, the second surface of each of the plurality of battery units is disposed toward a side wall of the restraint assembly, and there is a second gap between the second surface and an inner surface of a side wall of the restraint assembly on the corresponding side, the second gap forms a second exhaust passage, and the communication hole is disposed on the restraint assembly at a position corresponding to the second gap, and communicates the second exhaust passage with the first exhaust passage.

In some embodiments, the battery pack further including a fireproof member, the fireproof member including:
a first portion abutting against the inner surface of the side wall of the restraint assembly, wherein a gap is formed between the first portion and the second surface of each of the battery units on the corresponding side; and
two second portions respectively connected to both ends of the first portion along the height direction, and extending toward the second surface until abutting against the second surface, wherein an avoidance hole is provided on one of the two second portions at a position corresponding to the communication hole; and
wherein the first explosion-proof valve is located between the two second portions.

In some embodiments, the box assembly includes: a box and a cover which are snap-fit with each other in a height direction of the battery pack, and the box is internally provided with a plurality of fixed beams;
the restraint assembly includes: a first restraint member and a second restraint member, which are snap-fit with each other in the height direction to form the accommodating cavity;
wherein the communication hole is disposed on the first restraint member, there is a first gap between the box and the first restraint member along the height direction, and the first gap forms the first exhaust passage.

In some embodiments, the first restraint member includes: a first limiting portion and two first mounting portions, the first limiting portion covers a portion of the battery module close to the box, and the two first mounting portions are respectively connected to both sides of the first limiting portion along an arrangement direction of the plurality of fixed beams;

the second restraint member includes: a second limiting portion and two second mounting portions, wherein the second limiting portion covers a portion of the battery module close to the cover, and the two second mounting portions are respectively connected to both sides of the second limiting portion along the arrangement direction of the plurality of fixed beams; and wherein an accommodating cavity is formed between the first limiting portion and the second limiting portion, and one of the two second mounting portions and one of the two first mounting portions located on the same side of the battery module are stacked in the height direction and fixed to the same one of the plurality of fixed beams.

In some embodiments, the first limiting portion entirely protrudes relative to the two first mounting portions toward a bottom side of the box; and/or the second limiting portion entirely protrudes relative to the two second mounting portions toward a top side of the cover.

In some embodiments, the battery pack further including:

a second explosion-proof valve disposed on the box assembly and communicating with the first exhaust passage.

According to another aspect of the embodiments of the present disclosure, a transportation vehicle is provided. The transportation vehicle includes the battery pack according to the above-described embodiments, which is configured to supply electrical energy.

BRIEF DESCRIPTION OF THE ACCOMPANYING DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure. In the accompanying drawings.

Figure 1:
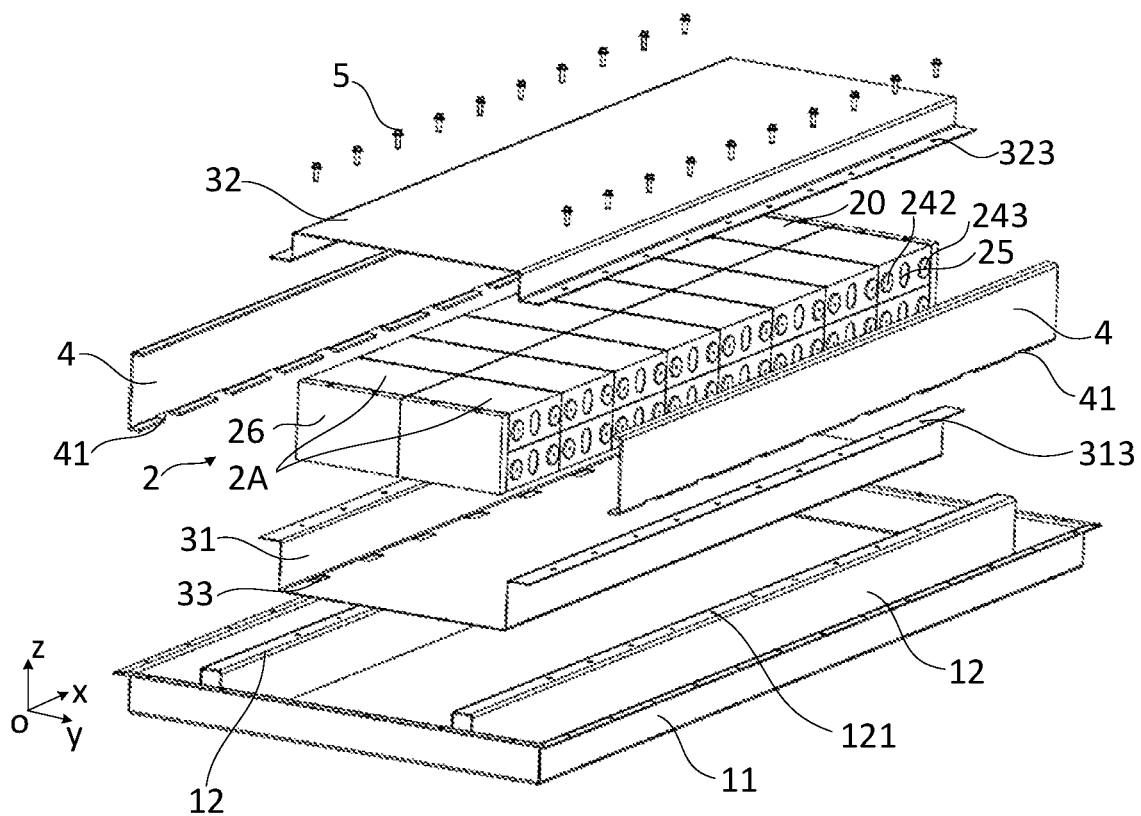
FIG. 1 is an exploded schematic view of a battery pack according to some embodiments of the present disclosure.
Figure 2:
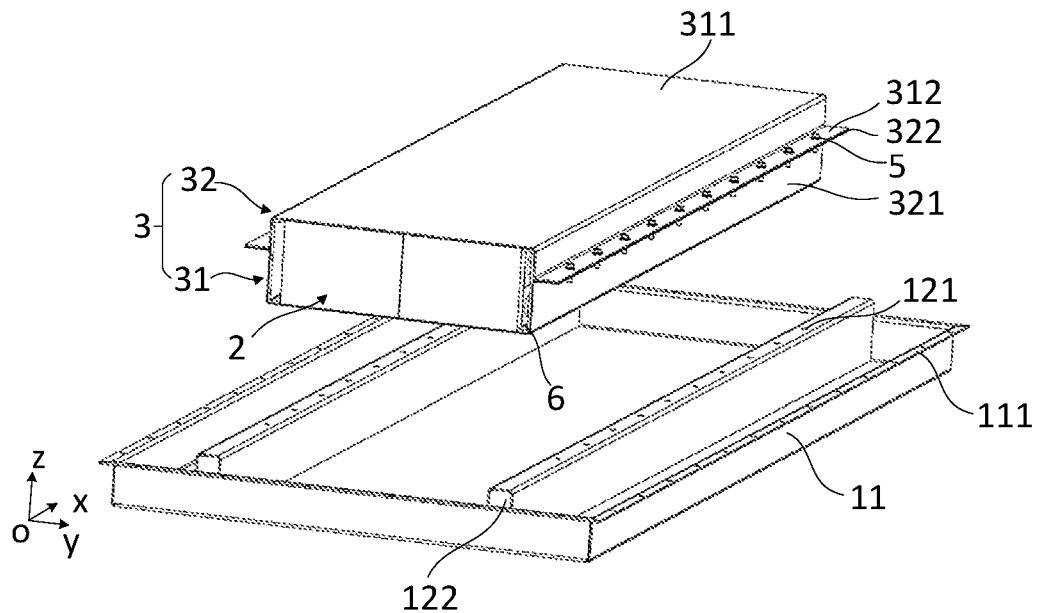
FIG. 2 is a schematic view showing a state in which the battery pack shown in FIG. 1 entirely removes the battery module and the restraint assembly out of the box.

DESCRIPTION OF REFERENCE SIGNS 1. box assembly; 11. box; 111. first flanging; 12. fixed beam; 121. third mounting hole; 122. lightening slot; 13. cover; 131. second flanging;
2. battery module; 2A. battery unit assembly; 20. battery unit; 21. housing; 22. electrode assembly; 221. first pole piece; 222. second pole piece; 223. diaphragm; 224. flat surface; 23. adapter piece; 24. cover plate assembly; 241. cover plate; 242. first electrode terminal; 243. second electrode terminal; 25. first explosion-proof valve; 26. end plate; S1. first surface; S2. second side; S3. third side;
3. restraint assembly; 31. first restraint member; 311. first limiting portion; 312. first mounting portion; 313. first mounting hole; 32. second restraint member; 321. second limiting portion; 322. second mounting portion; 323. second mounting hole; 33. communication hole;
4. fireproof member; 41. avoidance hole; 42. first portion; 43. second portion;
5. fastener; 6. accommodating cavity; 7. first exhaust passage; 8. second exhaust passage; 9. second explosion-proof valve; 10. thermal insulation layer.

DETAILED DESCRIPTION OF THE PREFERRED EMBODIMENTS

The present disclosure will be explained in detail below. In the following paragraphs, different aspects of the embodiments will be defined in more detail. Each aspect thus defined may be combined with any other aspect or aspects unless it is specifically indicated that combination is impossible. In particular, any feature that is considered to be preferred or advantageous may be combined with one or more other features that are considered to be preferred or advantageous.

The terms "first" and "second" recited in the present disclosure are merely for ease of description, to distinguish different constituent parts having the same name, rather than indicating a sequential or primary-secondary relationship.

In addition, when an element is referred to as being "on" another element, it may be directly on another element, or one element or may be indirectly on another element with one or more intermediate elements therebetween. In addition, when an element is referred to as being "connected to" another element, the element may be directly connected to another element, or may be indirectly connected to another element with one or more intermediate elements therebetween. In the following, the same reference numerals present the same elements.

In the present disclosure, "a plurality of" refers to two or more (including two), and similarly, "a plurality of groups" refers to two or more groups (including two groups), and "a plurality of pieces" refers to two or more pieces (including two pieces).

In order to clearly describe each orientation in the following embodiments, for example, the coordinate system in FIG. 1 defines each direction of the battery pack, wherein an x direction represents a length direction of the battery pack (hereinafter referred to as a length direction for short); a y direction represents a width direction of the battery pack (hereinafter referred to as a width direction for short); a z direction which is perpendicular to a plane formed by the x and y directions, represents a height direction of the battery pack (hereinafter referred to as a height direction for short). Based on such orientation definition, "up", "down", "top", and "bottom" are all relative to a height direction.

The embodiments of the present disclosure provide a battery pack and a vehicle, which can improve the operation safety of the battery pack. In the battery pack according to the embodiments of the present disclosure, a restraint assembly is provided within a box assembly, and an accommodating cavity for accommodating a battery module is provided inside the restraint assembly. Since the battery module is provided within the restraint assembly, when the battery module suffers from thermal runaway, fluids such as sparks and hot air ejected from the accommodating cavity into the first exhaust passage directly through the communication hole, to facilitate the discharge of fluid, and it is possible to prevent the fluid from entering other restraint assemblies to affect normal battery modules, thereby improving the operational safety of the battery pack.

FIGS. 1 to 10 are schematic structural views of a battery pack according to some embodiments of the present disclosure. The battery pack may be used in a transportation vehicle to supply electrical energy for operation of the device. For example, the transportation includes a vehicle or a ship. The battery pack may include a box assembly 1, a restraint assembly 3 and a battery module 2.

The restraint assembly 3 is disposed within the box assembly 1, and an accommodating cavity 6 is formed inside the restraint assembly 3. A first exhaust passage 7 is provided between the restraint assembly 3 and the box assembly 1. The restraint assembly 3 is provided with a communication hole 33. The communication hole 33 communicates the accommodating cavity 6 with the first exhaust passage 7.

The battery module 2 is disposed within the accommodating cavity 6. A plurality of battery modules 2 may be provided in the battery pack, and a plurality of restraint assemblies 3 may be provided accordingly. The battery modules 2 are respectively disposed within the accommodating cavities 6 of the restraint assemblies 3. Each of the accommodation cavities 6 is provided with one battery module 2. For example, the size of the accommodating cavity 6 is adapted to the overall external dimensions of the corresponding battery module 2. The battery module 2 includes a plurality of battery units 20, for example, the battery module 2 may be provided with one layer or stacked with a plurality of layers of battery units 20 along the height direction.

In this embodiment, the battery module 2 is disposed within the restraint assembly 3, and the restraint assembly 3 encloses the battery module 2 in an area beyond the communication hole 33. Each of the restraint assemblies 3 is independent of each other. When the battery module 2 suffers from thermal runaway, fluid may be ejected, for example, the fluid includes hot air and sparks and mist-like electrolyte mingled in the hot air. The fluid can only enter from the accommodating cavity 6 into the first exhaust passage 7 directly through the communication hole 33, to facilitate the discharge of fluid, and it is possible to prevent the fluid from entering other restraint assemblies 3 to affect normal battery modules 2, thereby improving the operational safety of the battery pack.

As shown in FIG. 1, a plurality of fixed beams 12 are provided inside the box assembly 1, and the fixed beams 12 may be disposed at intervals inside the box assembly 1 along the length direction (x direction) or the width direction (y direction). The restraint assembly 3 is fixed to two adjacent fixed beams 12, and a first exhaust passage 7 is formed among the restraint assembly 3, the box assembly 1 and the two adjacent fixed beams 12. Therefore, the first exhaust passage 7 may be directly formed by the box assembly 1, the restraint assembly 3, and the fixed beam 12, without adding additional structural members, which may simplify the structure and reduce the machining difficulty.

The box assembly 1 may include: a box 11 and a cover 13 which are snap-fit to each other in the height direction. The cover 13 encloses the opening end of the box 11. Here, the word "enclose" refers to a sealed connection between the box 11 and the cover 13, which may prevent external liquid and water vapor from entering the battery pack, and improve the safety performance of the battery pack.

The box 11 is located at the bottom of the cover 13, and the plurality of fixed beams 12 may be fixed to the box 11. For example, the fixed beam 12 may be fixed on the inner bottom surface or the sidewall of the box 11. For the specific structure of the fixed beam 12, a solid or hollow structure may be used. For example, a lightening slot 122 is provided inside the fixed beam 12. The cross section of the fixed beam 12 may be rectangular, trapezoidal or C-shaped and the like, and the upper surface thereof may be provided as a flat surface, so as to fix the restraint assembly 3 on the upper surface of the fixed beam 12. Alternatively, the restraint assembly 3 may also be fixed on the side of the fixed beam 12.

Figure 5:
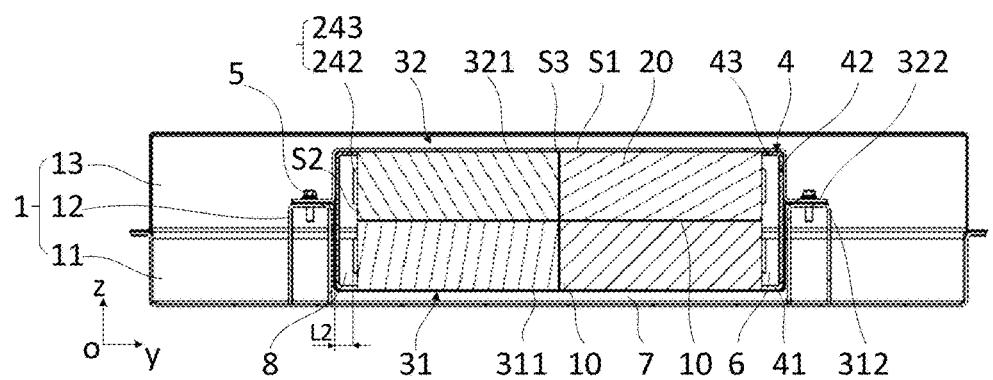
FIG. 5 is a cross-sectional view of the battery pack shown in FIG. 1 along a yz plane.
Figure 8:
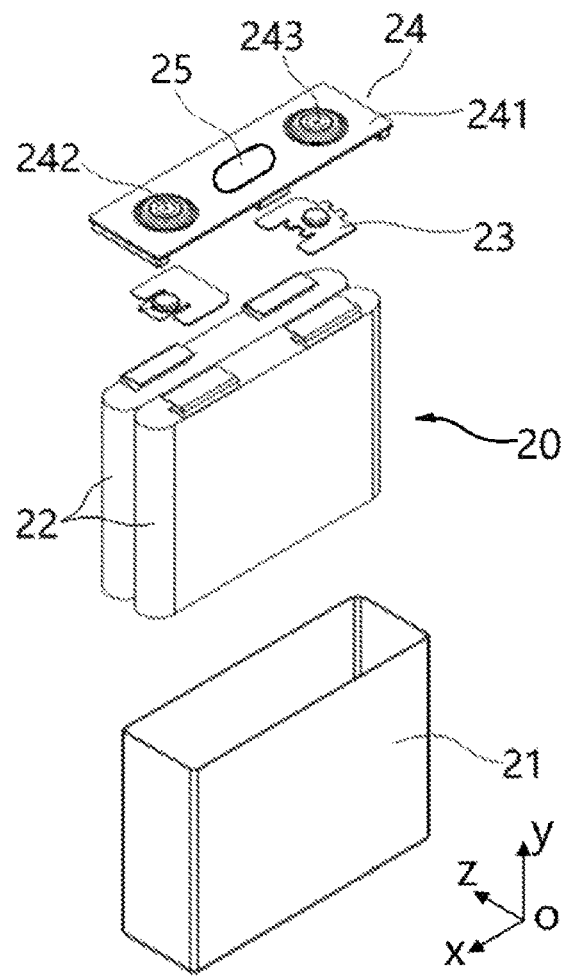
FIG. 8 is an exploded schematic view of battery units in a battery pack according to some embodiments.

As shown in FIGS. 1 and 8, each of the plurality of battery units 20 is provided with a first explosion-proof valve 25, which is configured to open when a difference between the internal and external pressures of the battery unit 20 exceeds a first preset pressure value, so as to discharge the gas in 20 within the battery unit 20. As shown in FIG. 5, a second exhaust passage 8 is formed between the restraint assembly 3 and the battery module 2 inside, and each of the first explosion-proof valves 25 faces the second exhaust passage 8, and the communication hole 33 communicates the second exhaust passage 8 with the first exhaust passage 7.

In some embodiments, the volume of the second exhaust passage 8 is smaller than that of the first exhaust passage 7, so that the pressure within the second exhaust passage 8 is greater than the pressure within the first exhaust passage 7, which can allow the fluid released by the battery unit 20 to smoothly enter the first exhaust passage 7 from the second exhaust passage 8 through the first explosion-proof valve 25 so as to ensure that the fluid is rapidly guided to the outside of the battery pack according to a predetermined discharge path, thereby lowering the risk of thermal runaway in other battery modules 2, and further improving the operational safety of the battery pack.

As shown in FIGS. 1 and 5, the battery pack of the present disclosure may further include a fireproof member 4, the fireproof member 4 is provided between the restraint assembly 3 and the battery module 2 and covering the first explosion proof valve 25 of each of the plurality of battery units 20, and a second exhaust passage 8 is formed between the fireproof member 4 and the battery module 2. For example, the fireproof member 4 may be made from a fireproof material, such as a mica board or the like, or a fireproof coating may be externally applied to the metal structure.

By providing the fireproof member 4, when the battery unit 20 suffering from thermal runaway releases a fluid such as hot air and sparks through the first explosion-proof valve 25, the fluid may be prevented from directly impacting the restraint assembly 3. Since the restraint assembly 3 is generally formed by bending a sheet, when the fluid has a high temperature or a fast speed, it is likely to cause the restraint assembly 3 to deform or break through the restraint assembly 3, so that the fluid safely enters the first exhaust passage 7 through the communication hole 33, thereby improving the safety and the operational reliability of the battery pack structure, The specific structure that may be used by the above-described members will be specifically described below with the battery pack shown in FIG. 1 as an example.

The battery units 20 in the battery module 2 forms at least one battery unit assembly 2A. The electrical connection manners among each of the battery unit assemblies 2A is provided to be in series, parallel, or both in series and parallel. An end plate 26 is provided at an end of the fixed beam 12 along the extending direction thereof.

Within the horizontal plane, two adjacent battery unit assemblies 2A may be mounted in such a manner that the electrode terminals face each other, and it is necessary to leave a safe distance between the electrode terminals of adjacent battery unit assemblies 2A. Alternatively, two adjacent battery unit assemblies 2A may be mounted in such a manner that the electrode terminals face away from each other, which may save the installation space, and a cooling plate may be provided between two adjacent battery unit assemblies 2A to achieve cooling, so that two adjacent battery unit assemblies 2A are cooled at the same time by a cooling plate.

The battery unit assembly 2A includes a plurality of battery units 20 disposed side by side along the length direction or width direction of the battery pack. As shown in FIG. 5, each of the plurality of battery units 20 includes a first surface S1, a second surface S2, and a third surface S3, wherein the first surface S1 is the largest side surface of each of the plurality of battery units 20; the second surface S2 is perpendicular to the first surface S1, and provided with a first explosion-proof valve 25, a first electrode terminal 242, and a second electrode terminal 243; the third surface S3 and the second surface S2 are oppositely disposed.

The first surface S1 of each of the battery units 20 is opposite to the top side or the bottom side of the restraint assembly 3. Such arrangement manner is also referred to as flat arrangement, which may improve the space utilization rate inside the battery pack. Since the height of the battery unit assembly 2A is relatively short in the height direction, the overall height of the battery pack may be reduced in a flat arrangement manner, which is more suitable for vehicles with a relatively short installation space for the battery pack. Moreover, for a flat arrangement manner of each of the battery units 20, the positive and negative pole pieces of the electrode assembly 22 are stacked along the height direction of the battery pack, and the expansion force of the battery unit 20 may be transferred along the height direction, so that it is possible to suppress the expansion force produced by the electrode assembly 22 by way of the restraint assembly 3. Even if the restraint assembly 3 is deformed under the effect of the expansion force, the first exhaust passage 7 may also provide an expansion space for the restraint assembly 3.

Alternatively, the second surface S2 of each of the plurality of battery units 20 may also be opposite to the top side of the restraint assembly 3.

In FIG. 1, the battery units 20 in the same battery unit assembly 2A are disposed side by side along the length direction (x direction). Two rows of battery unit assemblies 2A are disposed along the width direction (x direction). In practical applications, three rows or more may also be provided. In the height direction (z direction), one or more layers of battery unit assemblies 2A may also be provided, and each layer of battery unit assemblies 2A may be stacked along the height direction.

In order to avoid heat transfer from the battery units 20 suffering from thermal runaway to adjacent battery units 20, the battery pack may include a thermal insulation layer 10 provided between two adjacent battery units 20. For example, a thermal insulation layer 10 is provided between two adjacent battery units 20 in the height direction, or a thermal insulation layer 10 is provided between adjacent battery units 20 within a horizontal plane. The thermal insulation layer 10 may be a thermal insulation glue, which may fix the respective battery units 20 to each other while producing a thermal insulation effect.

Figure 6:
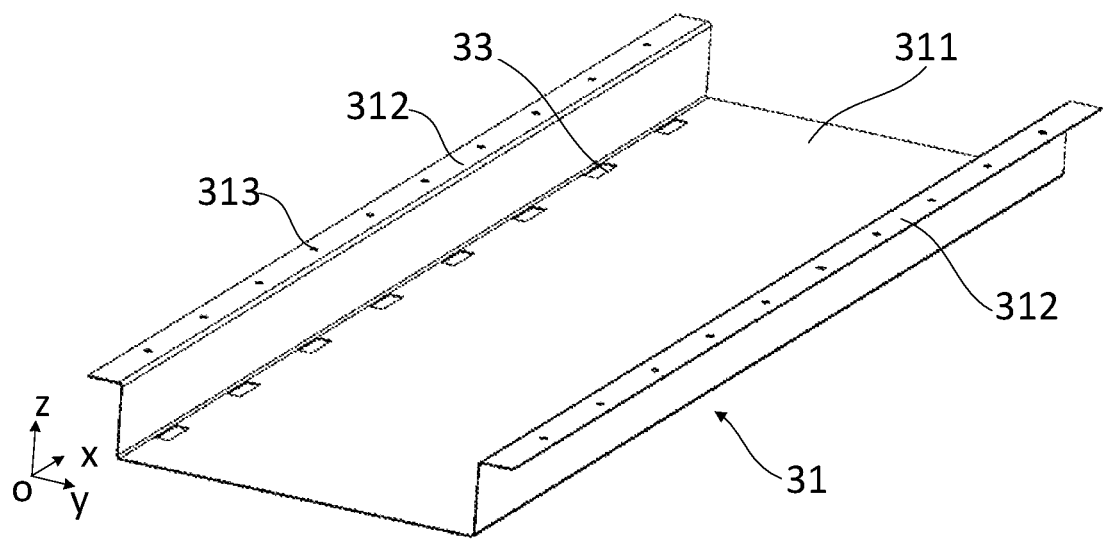
FIG. 6 is a schematic structural view of a first restraint member in the battery pack shown in FIG. 1.

On such basis, as shown in FIG. 6, the restraint assembly 3 is provided with a plurality of communication holes 33, each of which is provided in one-to-one correspondence with each of the first explosion-proof valves 25 in one layer. For the embodiment in which the second surfaces S2 of the battery units 20 in two groups of battery unit assemblies 2A are disposed towards a direction facing away from each other, a column of communication holes 33 are provided at areas on both sides of the restraint assembly 3 along the arrangement direction of the plurality of fixed beams 12. Each column of communication holes 33 includes a plurality of communication holes 33 disposed at intervals along the extending direction of the fixed beam 12, and are in one-to-one correspondence with the first explosion-proof valves 25 of the single-layer battery units 20 in the battery unit assembly 2A respectively. For example, the communication hole 33 may be circular, oval, polygonal, or other irregular shapes.

With such structure, when any of the battery units 20 in the battery module 2 suffers from thermal runaway, it is possible to allow the released fluid to enter the first exhaust passage 7 through the communication hole 33 at the corresponding position in the shortest path, and to discharge through a plurality of communication holes 33 at the same time, which may lessen the fluid discharge time and reduce the risk of thermal runaway in other battery units 20 of the battery module 2 or in other battery modules 2.

Figure 4:
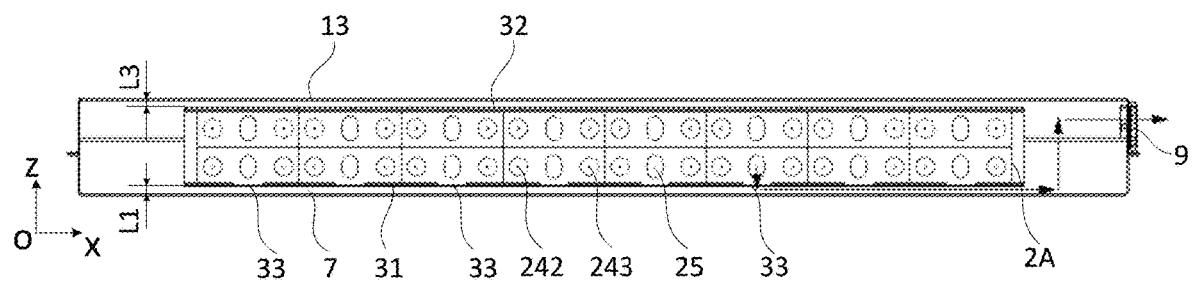
FIG. 4 is a cross-sectional view of the battery pack shown in FIG. 1 along an xz plane.

As shown in FIGS. 4 and 5, there is a first gap L1 between the outer side of the restraint assembly 3 and the inner side of the box assembly 1. The outer side of the restraint assembly 3 and the inner side of the box assembly 1 face each other along the height direction. The first gap L1 forms the first exhaust passage 7.

With such structure, it is possible to allow the space between the restraint assembly 3 and the box assembly 1 to serve as the first exhaust passage 7 with a larger area, when the battery module 2 suffers from thermal runaway, the air pressure within the first exhaust passage 7 is lower, the fluid released during thermal runaway may be discharged more smoothly, thereby preventing more fluid accumulated within the accommodating cavity 6, and the air pressure and temperature within the accommodating cavity 6 may be rapidly reduced, thereby improving the safety of the battery pack.

As shown in FIGS. 1 and 6, the communication hole 33 is provided on the top side or bottom side of the restraint assembly 3, and located on the same side as the first exhaust passage 7 in the height direction. In this way, the fluid released when the battery module 2 suffers from thermal runaway may enter the first exhaust passage 7 directly through the communication hole 33 from the second exhaust passage 8 without passing through an additional guide path, which may improve the fluid discharge efficiency. Moreover, after the fluid directly enters the first exhaust passage 7, since the first exhaust passage 7 has a large volume, the pressure of the fluid may be instantaneously reduced, and the temperature may also be reduced accordingly, which may prevent a continuous increase in the pressure and temperature within the battery pack and improve the operational safety.

In some embodiments, the communication hole 33 is provided in the bottom side of the restraint assembly 3, and a first gap L1 between the outer side at the bottom of the restraint assembly 3 and the inner side at the bottom of the box assembly 1 forms a first exhaust passage 7. When the battery pack is installed in the vehicle, when the battery module 2 suffers from thermal runaway, the airflow having a high temperature is concentrated and discharged in the bottom area of the battery pack, thereby preventing the impact on personnel and articles within the vehicle body and improving the safety within the vehicle body.

As shown in FIG. 5, the second surface S2 of each of the plurality of battery units 20 is disposed toward the side wall of the restraint assembly 3, and a second gap L2 is provided between the second surface S2 of the restraint assembly 3 and an inner surface of a side wall of the restraint assembly 3 on the corresponding side. The second gap L2 forms a second exhaust passage 8. The communication hole 33 is provided on the restraint assembly 3 at a position corresponding to the second gap L2, and communicates the second exhaust passage 8 with the first exhaust passage 7.

By providing the second gap L2, a space may be reserved for the first electrode terminal 242, the second electrode terminal 243, and a busbar connecting the first electrode terminal 242 and the second electrode terminal 243, and also for between the first explosion-proof valve 25 and the side wall of the restraint member 3. During thermal runaway in the battery unit 20, the fluid released through the first explosion-proof valve 25 diffuses into the second exhaust passage 8, and flows rapidly into the first exhaust passage 7 through a plurality of communication holes 33. Moreover, since the volume of the second exhaust passage 8 is smaller than that of the first exhaust passage 7, the pressure within the second exhaust passage 8 is higher than that within the first exhaust passage 7, so that the fluid may be smoothly discharged according to a preset path.

As shown in FIG. 4, the extending direction of the fireproof member 4 is consistent with the same of the fixed beam 12. The fireproof member 4 includes: a first portion 42 and two second portions 43. The first portion 42 abuts against the inner surface of the side wall of the restraint assembly 3, and forms a second gap L2 between the first portion 42 and the second surface S2 of each of the battery units 20 on the corresponding side. The two second portions 43 are respectively connected to both ends of the first portion 42 along the height direction and extending toward the second surface S2 until abutting against the second surface S2. The second portion 43 is provided with an avoidance hole 41 at a position corresponding to the communication hole 33. Wherein, the first explosion-proof valve 25 is located between the two second portions 43. Further, the two second portions 43 may abut against the top side and the bottom side of the restraint assembly 3 respectively.

Figure 7:
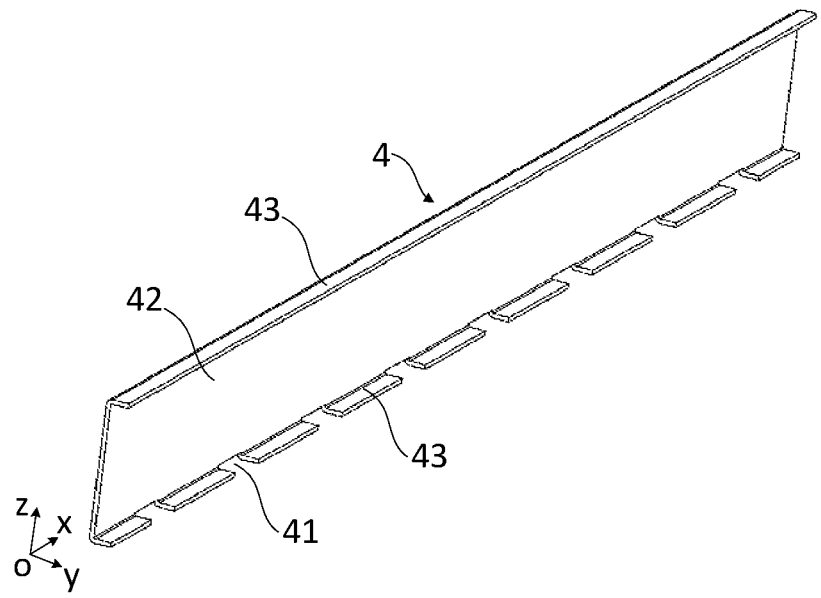
FIG. 7 is a schematic structural view of a fireproof member in the battery pack shown in FIG. 1.

As shown in FIG. 7, the avoidance hole 41 may be provided on one of the two second portions 43 at the bottom. As shown in FIG. 6, the communication hole 33 is a rectangular slot. Accordingly, the avoidance hole 41 may be a rectangular hole which is open on a side of the second portion 43 away from the side of the first portion 42. As a result, a plurality of avoidance holes 41 are provided at intervals in the second portion 43 along the extending direction of the fixed beam 12. Such structure is easily machined and can enhance the structural stability of the fireproof member 4 whilst not affecting the discharge of fluid.

The fireproof member 4 integrally forms a space surrounding the first explosion-proof valves 25, and forms a second exhaust passage 8 between the fireproof member 4 and the second surface S2 of each of the battery units 20, which may prevent fluid from directly impacting the restraint assembly 3 when the battery unit 20 suffering from thermal runaway releases fluids such as hot air and sparks through the first explosion-proof valve 25. The fireproof member 4 abuts against the restraint assembly 3, so that the fireproof member 4 may be reliably positioned to prevent shaking.

As shown in FIG. 5, the restraint assembly 3 includes: a first restraint member 31 and a second restraint member 32. The first restraint member 31 and the second restraint member 32 are snap-fit with each other in the height direction to form an accommodating cavity 6. The first restraint member 31 is configured to limit the freedom of movement of the battery module 2 toward the box 11 along the height direction, and the second constraint member 32 is configured to limit the freedom of movement of the battery module 2 toward the cover 13 along the height direction. Wherein, the communication hole 33 is disposed on the first restraint member 31, and there is a first gap L1 between the box 11 and the first restraint member 31 along the height direction. The first gap L1 forms the first exhaust passage 7.

In this embodiment, the communication hole 33 is disposed in the first restraint member 31 at the bottom side, and the first gap L1 between the first restraint member 31 and the box 11 forms the first exhaust passage 7. When the battery pack is installed on the vehicle, upon thermal runaway in the battery module 2, the airflow having a high temperature is concentrated and discharged in the bottom area of the battery pack, thereby preventing the impact on personnel and articles within the vehicle body and improving the safety within the vehicle body.

Specifically, as shown in FIG. 5, the first restraint member 31 includes a first limiting portion 311 and two first mounting portions 312. The first limiting portion 311 covers a portion of the battery module 2 close to the box 11. The two first mounting portions 312 are respectively connected to both sides of the first limiting portion 311 along the arrangement direction of the plurality of fixed beams 12. The first limiting portion 311 entirely protrudes relative to the two first mounting portion 312 toward a bottom side of the box 11.

The second restraint member 32 includes: a second limiting portion 321 and two second mounting portions 322. The second limiting portion 321 covers a portion of the battery module 2 close to the cover 13. The two second mounting portions 322 are respectively connected to both sides of the second limiting portion 321 along the arrangement direction of the plurality of fixed beams 12.

Wherein, the accommodating cavity 6 is formed between the first limiting portion 311 and the second limiting portion 321. One of the two second mounting portions 322 and one of the two first mounting portions 312 located on the same side of the battery module 2 are stacked in the height direction, and fixed to the same one of the plurality of fixed beams 12 by a group of fasteners 5. The second limiting portion 321 entirely protrudes relative to the two second mounting portion 322 toward a top side of the cover 13.

As shown in FIG. 1, the first mounting portion 312 is provided with a plurality of first mounting holes 313 at intervals along the extending direction of the fixed beam 12, and the second mounting portion 322 is provided with a plurality of second mounting holes 323 at intervals along the extending direction of the fixed beam 12. The fixed beam 12 is provided with a plurality of third mounting holes 121 along the extending direction thereof. The fastener S sequentially passes through the second mounting hole 323, the first mounting hole 313, and the third mounting hole 121 from the top, so as to fix the first restraint member 31 and the second restraint member 32 to the fixed beam 12.

Figure 3:
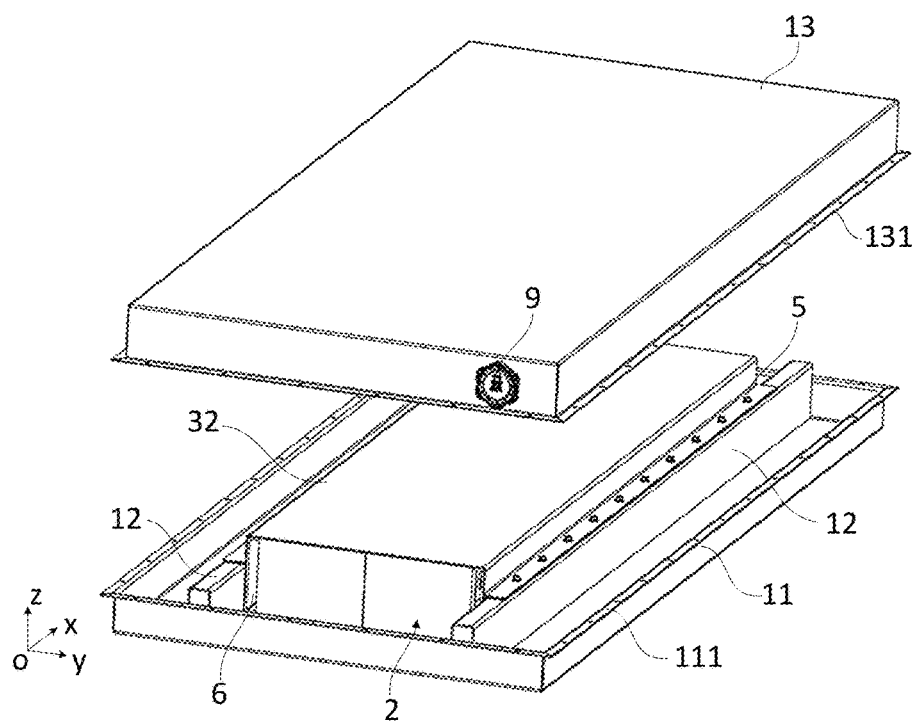
FIG. 3 is a schematic view of a state in which the battery pack shown in FIG. 1 opens the cover.

As shown in FIG. 3, the battery pack further includes: a second explosion-proof valve 9 provided on the box assembly 1 and communicating with the first exhaust passage 7, which is configured to open to discharge an internal fluid when a difference between the internal and external pressures of the box assembly 1 exceeds a second preset pressure value. Specifically, the second explosion-proof valve 9 may be provided on a side of the cover 13 located at one end of the fixed beam 12.

Still referring to FIG. 3, in order to fix the cover 13 with the box 11, a first flanging 111 is provided around the opening end of the box 11, and a second flanging 131 is provided around the cover 13. The first flanging 111 and the second flanging 131 may be fixed therebetween in a manner of adhesive or a fastener.

The battery packs of the above-described embodiments respectively cover different battery modules 2 through a plurality of second restraint members 32, and are fixed to the corresponding fixed beams 12 (that is, the fixing points between the second restraint member 32 and the box 11 are increased), so that the span between the fixing points is reduced, which may improve the deformation resistance of the second restraint member 32. When the battery unit 20 expands, the second restraint member 32 is not easily deformed, which may further provide a stable pressing force to the battery module 2 so as to prevent an increased size of the battery pack in the height direction, and it is also not likely to extrude the cover 13 due to the deformation of the restraint member 32, which may improve the service life of the battery pack.

As shown in FIG. 4, there is a third gap L3 between the inner surface of the top wall of the box assembly 1 and the outer surface of the top wall of the restraint assembly 3, that is, there is a third gap L3 between the inner surface of the cover 13 and the outer surface of the second restraint member 32. By providing the first gap L1 and the third gap L3, even if the restraint assembly 3 is deformed due to the expansion of the battery unit 20, it is also possible to prevent deformation of the box assembly 1.

The fluid discharge manner of the battery pack of the present disclosure upon thermal runaway will be described below in conjunction with FIGS. 4 and 5. As shown in FIG. 5, when the battery module 2 has a battery unit 20 suffering from thermal runaway, fluids such as hot air and sparks may be released by the first explosion-proof valve 25 inside the battery unit 20 into the second exhaust passage 8 to circulate, and enter the first exhaust passage 7 through the plurality of communication holes 33 in the first limiting portion 311 during the flow. Referring to FIG. 4, the fluid flows within the first exhaust passage 7 and flows upwards in a space formed between the restraint assembly 3 and the side of the box assembly 1, such as to be discharged out of the battery pack through the second explosion-proof valve 9. Such battery pack may prevent sparks from splashing into other battery modules 2 with normal performance, and at the same time may prevent hot air from baking other battery modules 2 and reduce the risk of thermal runaway in multiple battery modules 2 after thermal diffusion.

The specific structure of the battery unit 20 in each of the above-described embodiments will be described below in conjunction with FIGS. 8 to 10.

As shown in the exploded schematic view in FIG. 8, each of the battery units 20 includes: a housing 21 and an electrode assembly 22 disposed within the housing 21. The housing 21 may have a hexahedron shape or other shapes and include an opening. The electrode assembly 22 is accommodated within the housing 21. The opening of the housing 21 is covered with a cover plate assembly 24. The cover plate assembly 24 includes a cover plate 241 and two electrode terminals provided on the cover plate. The two electrode terminals are a first electrode terminal 242 and a second electrode terminal 243 respectively. The first electrode terminal 242 may be a positive electrode terminal, and the second electrode terminal 243 may be a negative electrode terminal. In other embodiments, the first electrode terminal 242 may be a negative electrode terminal, and the second electrode terminal 243 may be a positive electrode terminal. An adapter piece 23 is provided between the cover plate assembly 24 and the electrode assembly 22. The tabs of the electrode assembly 22 are electrically connected to the electrode terminals on the cover plate 241 through the adapter piece 23. In the present embodiment, there are two adapter pieces 23, that is, a positive adapter piece and a negative adapter piece respectively.

As shown in FIG. 8, the housing 21 is internally provided with two electrode assemblies 22, which are stacked along the height direction (z direction) of the battery units 20, wherein the height direction of the battery units 20 conforms to that of the battery pack. Of course, in other embodiments, the housing 21 may be also be internally provided with one electrode assembly 22, or three or more electrode assemblies 22 The plurality of electrode assemblies 22 are stacked along the height direction (z direction) of the battery units 20.

Figure 9:
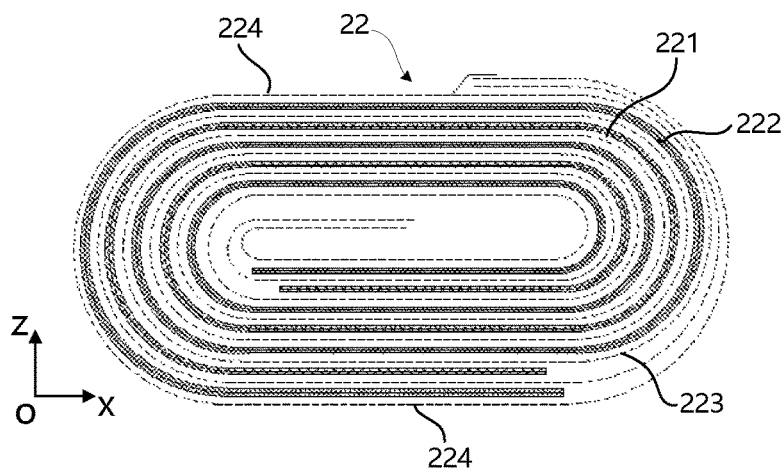
FIG. 9 is a cross-sectional view of battery units using a wound electrode assembly along the xz plane.
Figure 10:
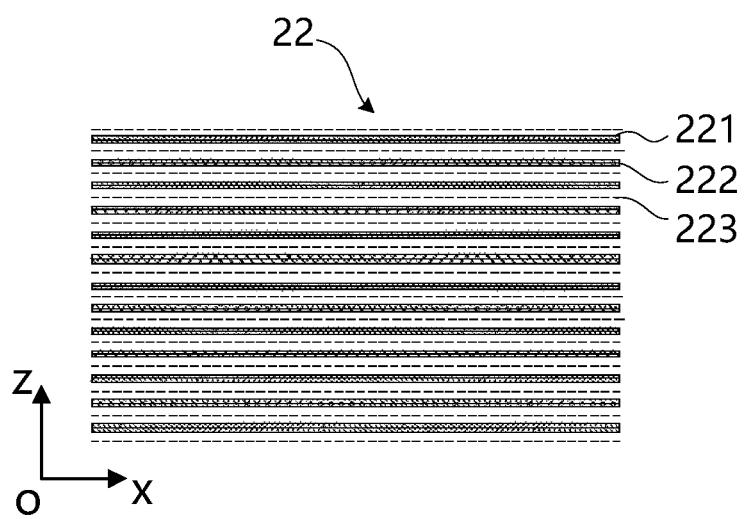
FIG. 10 is a cross-sectional view of battery units using a laminated electrode assembly along the xz plane.

As shown in FIGS. 9 and 10, the electrode assembly 22 includes a first pole piece 221, a second pole piece 222, and a diaphragm 223 disposed between the first pole piece 221 and the second pole piece 222. The first pole piece 221 may be a positive pole piece, and the second pole piece 222 may be a negative pole piece. In other embodiments, the first pole piece 221 may also be a negative pole piece, and the second pole piece 222 may be a positive pole piece. Wherein, the diaphragm 223 is an insulator between the first pole piece 221 and the second pole piece 222. The active substance of the positive pole piece may be coated on the coating area of the positive pole piece, and the active substance of the negative pole piece may be coated on the coating area of the negative pole piece. The portion extending from the coating area of the positive pole piece serves as the positive electrode tab; the portion extending from the coating area of the negative pole piece serves as the negative electrode tab. The positive electrode tab is connected to the positive electrode terminal on the cover plate assembly 24 through the positive electrode adapter plate. Similarly, the negative electrode tab is connected to the negative electrode terminal on the cover plate assembly 24 through the negative electrode adapter plate.

As shown in FIG. 9, the electrode assembly 22 has a wound structure. Wherein, the first pole piece 221, the diaphragm 223, and the second pole piece 222 are all strip-like structures. The first pole piece 221, the diaphragm 223, and the second pole piece 222 are sequentially stacked and wound more than two turns to form the electrode assembly 22, and the electrode assembly 22 is flat-shaped. When the electrode assembly 22 is manufactured, the electrode assembly 22 may be directly wound into a flat shape, or may also be wound into a hollow cylindrical structure first, and then flattened into a flat shape after being wound. FIG. 9 is a schematic view of an outer contour of the electrode assembly 22. The outer surface of the electrode assembly 22 includes two flat surfaces 224, which are oppositely disposed along the height direction (z direction) of the battery unit 20. Wherein, the electrode assembly 22 is substantially a hexahedron structure, and the flat surface 224 is substantially parallel to the winding axis, and is the outer surface with a maximum area. The flat surface 224 may be a relatively flat surface, and is not required to be a pure plane.

As shown in FIG. 10, the electrode assembly 22 has a laminated structure, that is, the electrode assembly 22 includes a plurality of first pole pieces 221 and a plurality of second pole pieces 222, and diaphragms 223 are disposed between the first pole pieces 221 and the second pole pieces 222. The first pole pieces 221 and the second pole pieces 222 are stacked along the height direction (z direction) of the battery unit 20.

The electrode assembly 22 may inevitably expand along the thickness direction of the pole pieces during the charging and discharging processes. The expansion amounts of the respective pole pieces are superimposed, and the accumulated expansion amount in the height direction is greater than that in other directions. In the embodiments of the present disclosure, the direction of the battery unit 20 at a maximum expansion may be restrained by increasing the fixing points between the restraint assembly 3 and the box 11, thereby preventing deformation of the battery pack, and raising the service life of the battery pack.

The battery pack and the vehicle provided by the present disclosure have been introduced in detail above. Specific examples are applied herein to explain the principles and implementations of the present disclosure. The descriptions of the above embodiments are only intended to help understand the methods and core ideas of the present disclosure. It should be noted that for those of ordinary skill in the art, without departing from the principles of the present disclosure, several improvements and modifications may be made to the present disclosure, and these improvements and modifications also fall within the protection scope of the claims of the present disclosure.

What is claimed is:

1. A battery pack, comprising:
a box assembly;
a restraint assembly, disposed within the box assembly, wherein the restraint assembly is internally provided with an accommodating cavity, a first exhaust passage is provided between the restraint assembly and the box assembly, and the restraint assembly is provided with a communication hole which communicates the accommodating cavity with the first exhaust passage, the first exhaust passage being configured to provide an expansion space for the restraint assembly,
wherein a first gap is provided between an outer side of the restraint assembly and an inner side of the box assembly, the outer side of the restraint assembly and the inner side of the box assembly face each other along a height direction of the battery pack, and the first gap forms the first exhaust passage; and
a battery module, disposed within the accommodating cavity, the battery module comprising a plurality of battery units, each of the battery units comprising a housing and an electrode assembly disposed within the housing, wherein:
the electrode assembly comprises a wound structure, and an outer surface of the electrode assembly comprises two flat surfaces, which are oppositely disposed along a height direction of the battery unit; or
the electrode assembly comprises a laminated structure and comprises a plurality of first pole pieces and a plurality of second pole pieces, the first pole pieces and the second pole pieces being stacked along the height direction of the battery unit.

2. The battery pack according to claim 1, wherein the box assembly is internally provided with a plurality of fixed beams, the restraint assembly is fixed to two adjacent fixed beams, and the first exhaust passage is formed among the restraint assembly, the box assembly and the two adjacent fixed beams.

3. The battery pack according to claim 2, wherein each of the plurality of battery units is provided with a first explosion-proof valve; and
a second exhaust passage is provided between the restraint assembly and the battery module, each of the first explosion-proof valves faces the second exhaust passage, and the communication hole communicates the second exhaust passage with the first exhaust passage.

4. The battery pack according to claim 1, wherein each of the plurality of battery units is provided with a first explosion-proof valve; and
a second exhaust passage is provided between the restraint assembly and the battery module, each of the first explosion-proof valves faces the second exhaust passage, and the communication hole communicates the second exhaust passage with the first exhaust passage.

5. The battery pack according to claim 4, further comprising: a fireproof member disposed between the restraint assembly and the battery module and covering the first explosion-proof valve of each of the plurality of battery units, wherein the second exhaust passage is formed between the fireproof member and the battery module.

6. The battery pack according to claim 4, wherein the restraint assembly is provided with a plurality of the communication holes, each of which is in one-to-one correspondence with each of the first explosion-proof valves.

7. The battery pack according to claim 1, wherein a first surface of each of the plurality of battery units is opposite to a top side or a bottom side of the restraint assembly, the first surface is the largest side of each of the plurality of battery units, and a second surface of each of the plurality of battery units is provided with a first explosion-proof valve, the second surface is perpendicular to the first surface; wherein the communication hole is disposed on the top side or the bottom side of the restraint assembly.

8. The battery pack according to claim 7, wherein the second surface of each of the plurality of battery units is disposed toward a side wall of the restraint assembly, and there is a second gap between the second surface and an inner surface of a side wall of the restraint assembly on a corresponding side, the second gap forms a second exhaust passage, and the communication hole is disposed on the restraint assembly at a position corresponding to the second gap, and communicates the second exhaust passage with the first exhaust passage.

9. The battery pack according to claim 8, further comprising a fireproof member, the fireproof member comprising:
a first portion abutting against the inner surface of the side wall of the restraint assembly, wherein a gap is formed between the first portion and the second surface of each of the battery units on the corresponding side; and two second portions respectively connected to both ends of the first portion along the height direction of the battery pack, and extending toward the second surface and abutting against the second surface, wherein an avoidance hole is provided on one of the two second portions at a position corresponding to the communication hole; and wherein the first explosion-proof valve is located between the two second portions.

10. The battery pack according to claim 1, wherein the box assembly comprises: a box and a cover which are snap-fit with each other in the height direction of the battery pack, and the box is internally provided with a plurality of fixed beams;

the restraint assembly comprises: a first restraint member and a second restraint member, which are snap-fit with each other in the height direction of the battery pack to form the accommodating cavity;

wherein the communication hole is disposed on the first restraint member, the first gap is between the box and the first restraint member along the height direction of the battery pack, and the first gap forms the first exhaust passage.

11. The battery pack according to claim 10, wherein:

the first restraint member comprises: a first limiting portion and two first mounting portions, the first limiting portion covers a portion of the battery module close to the box, and the two first mounting portions are respectively connected to both sides of the first limiting portion along an arrangement direction of the plurality of fixed beams;

the second restraint member comprises: a second limiting portion and two second mounting portions, wherein the second limiting portion covers a portion of the battery module close to the cover, and the two second mounting portions are respectively connected to both sides of the second limiting portion along the arrangement direction of the plurality of fixed beams; and wherein an accommodating cavity is formed between the first limiting portion and the second limiting portion, and one of the two second mounting portions and one of the two first mounting portions located on a same side of the battery module are stacked in the height direction of the battery pack and fixed to a same one of the plurality of fixed beams.

12. The battery pack according to claim 11, wherein:

the first limiting portion entirely protrudes relative to the two first mounting portions toward a bottom side of the box.

13. The battery pack according to claim 11, wherein the second limiting portion entirely protrudes relative to the two second mounting portions toward a top side of the cover.

14. The battery pack according to claim 11, wherein:

the first limiting portion entirely protrudes relative to the two first mounting portions toward a bottom side of the box; and the second limiting portion entirely protrudes relative to the two second mounting portions toward a top side of the cover.

15. The battery pack according to claim 1, further comprising:

a first explosion-proof valve disposed on the box assembly and communicating with the first exhaust passage.

16. A transportation vehicle, comprising:

the battery pack according to claim 1, which is configured to supply electrical energy.

* * * * *